United States Patent [19]

Kishi et al.

[11] Patent Number: 4,676,674

[45] Date of Patent: Jun. 30, 1987

[54] DATA INPUT/OUTPUT UNIT

[75] Inventors: Hajimu Kishi, Hino; Masaki Seki, Suginami; Yutaka Mizuno, Hachioji, all of Japan

[73] Assignee: Fanuc Ltd., Minamitsuru, Japan

[21] Appl. No.: 619,556

[22] PCT Filed: Oct. 14, 1983

[86] PCT No.: PCT/JP83/00355

§ 371 Date: Jun. 11, 1984

§ 102(e) Date: Jun. 11, 1984

[87] PCT Pub. No.: WO84/01638

PCT Pub. Date: Apr. 26, 1984

[30] Foreign Application Priority Data

Oct. 16, 1982 [JP] Japan .................... 57-181824

[51] Int. Cl.$^4$ .................................... B41J 5/52
[52] U.S. Cl. .................................... 400/4; 400/80; 400/70; 364/900
[58] Field of Search ... 364/200 MS File, 900 MS File; 400/1, 2, 63, 279, 283, 284, 288, 289, 342, 344, 4, 80

[56] References Cited

U.S. PATENT DOCUMENTS

| | | | |
|---|---|---|---|
| 3,205,996 | 9/1965 | Greenwood | 400/3 |
| 3,328,764 | 6/1967 | Sorensen et al. | 364/200 |
| 3,833,887 | 9/1974 | Shevlin | 364/200 |
| 4,051,945 | 10/1977 | Fujimoto et al. | 197/176 |
| 4,141,078 | 2/1979 | Bridges et al. | 364/900 |
| 4,150,901 | 4/1979 | Gubelmann | 400/4 |
| 4,245,308 | 1/1981 | Hirschman et al. | 364/200 |
| 4,311,399 | 1/1982 | Wegryn et al. | 400/76 |
| 4,464,730 | 8/1984 | Lawrence et al. | 364/900 |
| 4,487,517 | 12/1984 | Ozawa et al. | 400/279 |
| 4,540,299 | 9/1985 | Yamada | 400/708 |

Primary Examiner—Gareth D. Shaw
Assistant Examiner—Christina Eakman
Attorney, Agent, or Firm—Staas & Halsey

[57] ABSTRACT

Disclosed is a data input/output unit which is equipped with a control device (1), a tape puncher (5), a tape reader (4) and a printer (6), and which is capable of operating even in response to a command from a host computer. The printer (6) is provided with a tab set counter (6ca) for setting a number of spaces. A number equivalent to a predetermined number of spaces is added to a print number set in a bit counter (6cc) of the printer (6) and space print data indicative of a prescribed number of spaces is successively set at the beginning of print data for a line to be printed in a print character register (6cg), thereby making it possible to maintain a predetermined space at the left margin on printing paper.

3 Claims, 3 Drawing Figures

“DATA INPUT/OUTPUT UNIT

CROSS REFERENCE TO A RELATED APPLICATION

This application is related to U.S. application Ser. No. 619,555 by the same inventors and assigned to the assignee of the present invention.

BACKGROUND OF THE INVENTION

This invention relates to a transportable data input/output unit capable of being detached from the body of a numerical control device.

In numerical control, there are cases where a host computer is used to perform a variety of data processing operations to create command data for the machining of a workpiece. The data created by the host computer is recorded on a paper tape by a tape puncher and, with the paper tape serving as the recording medium, is used as input information for another system. In creating the paper tape, the contents of the tape are printed out by a printer in order to provide a record thereof beforehand. Where an output from the host computer is recorded on the paper tape or printed on recording paper, the paper tape puncher and printer ordinarily are provided separately from the host computer body. These pieces of equipment are connected to the host computer and operate solely in response to commands therefrom. Unlike a system in which such peripheral equipment is of a disjointed nature, a system is conceivable in which the equipment operates on the basis of commands from a host computer when connected to the computer, but in which the contents of a paper tape may be read independently and printed for copying purposes when the equipment is disconnected from the host computer. However, a system of such type can be applied to only very limited systems and is inapplicable to others in certain aspects. Moreover, even where applicable, a disadvantage is that results cannot be obtained unless the host computer software is modified. Furthermore, when printing is performed by a printer, it is customary to print out the first character starting from the left margin of the printing paper. In cases where the printing paper is bound on the left side after printing, some inconvenience is experienced as there is not enough room left on the left side of the paper.

SUMMARY OF THE INVENTION

Accordingly, the object of the present invention is to provide a data input/output unit of a numerical control device in a numerical control system, which input/output unit is detachable from a host computer and includes a tape puncher, tape reader and printer combined into one. The input/output unit has a printer which is capable of leaving a predetermined number of spaces at the left margin of printing paper when command data is to be printed out on the paper.

The present invention provides a processing function which not only enables a data input/output unit to operate in accordance with a command from a host computer in order to create a paper tape, print out transferred data and entered data, but which also enables the unit itself to be programmed independently to create a paper tape and print the data borne by the paper tape. A printer is provided with a tab set counter for setting a number of spaces. The arrangement is such that a number equivalent to a predetermined number of spaces is added to a print number set in a bit counter of the printer, and such that print data indicative of a prescribed number of spaces is set successively at the beginning of print data in a print character register. According to the present invention, there is provided a transportable data input/output unit capable of servicing several numerical control devices, and spaces equivalent to a predetermined number of characters can be left at the left side of a paper to, e.g., facilitate binding of the recording paper.

DETAILED DESCRIPTION OF THE PREFERRED EMBODIMENT

An embodiment of the present invention will now be described in detail with reference to the drawings.

Figure 1:
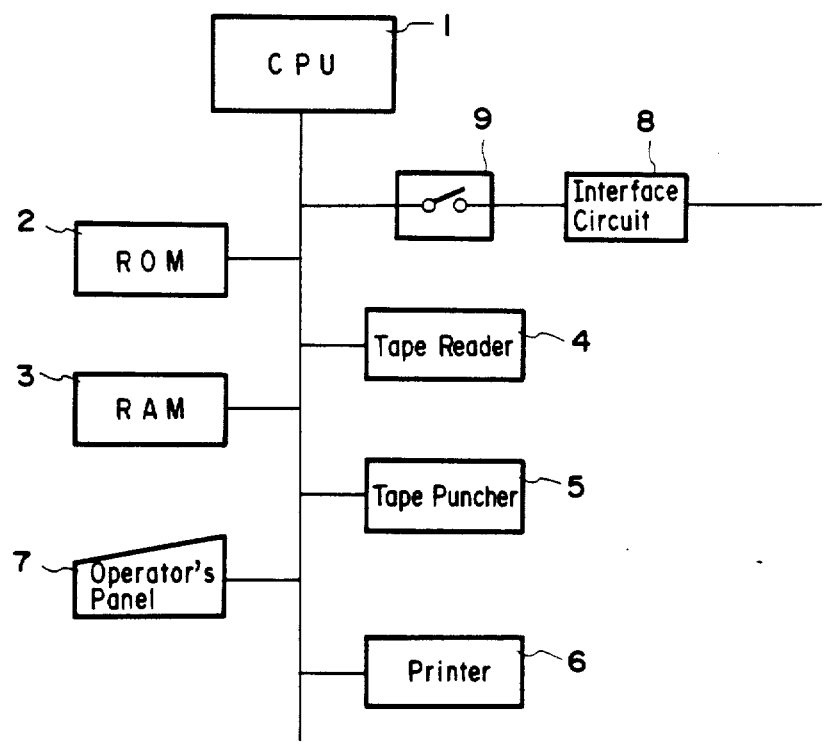
FIG. 1 is a block diagram of a data input/output unit according to the present invention.

FIG. 1 is a block diagram of a data input/output unit according to the present invention. In the Figure, numeral 1 denotes a control device, 2 a read-only memory (hereafter abbreviated to "ROM") storing a program necessary for operating the data input/output unit, 3 a random-access memory (hereafter abbreviated to "RAM") for temporarily storing data or the like read from a paper tape or the like, 4 a tape reader, 5 a tape puncher, and 6 a printer for printing data read by the tape reader, data punched by the tape puncher 5, or data received from a host computer. Numeral 7 denotes an operator's panel having character keys, numeric keys, function keys and the like. In particular, the panel has an operation changeover switch for deciding whether operation is by a command from the host computer or whether the data input/output unit of the present invention is to operate independently. Numeral 8 is an interface circuit for interfacing the host computer. Numeral 9 designates a changeover circuit.

The data input/output unit shown in FIG. 1 is capable of performing the following operations by itself. Specifically, data entered from the operator's panel 7 can be printed out immediately by the printer 6 and the data can be stored in the RAM 3. In addition, after the results of the print-out are checked, errors in the data stored in the RAM 3 can be corrected. After the correction operation, the data stored in the RAM 3 can be printed out and punched in a paper tape as well. Furthermore, serially concatentated data read from the tape reader 4 can be printed out by the printer 6 and punched in a paper tape by the tape puncher 5 to create a copy of the paper tape. These operations can be performed simultaneously.

The data input/output unit shown in FIG. 1 can be connected to a host computer by turning on the changeover circuit 9 through manipulation of the operation changeover switch provided on the operator's panel 7, and data can be transferred from the operator's panel 7 or tape reader 4 to the host computer through the RAM 3 or by by-passing the RAM. In addition, data transferred from the host computer can be recorded on a paper tape by the tape puncher 5, and the data can also be printed out by the printer 6.

Figure 2:
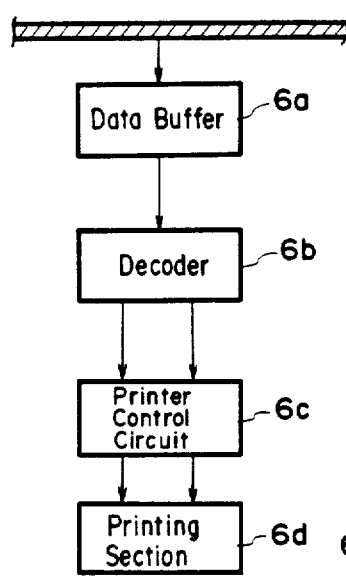
FIG. 2 is a block diagram showing the elements of a printer 6.
Figure 3:
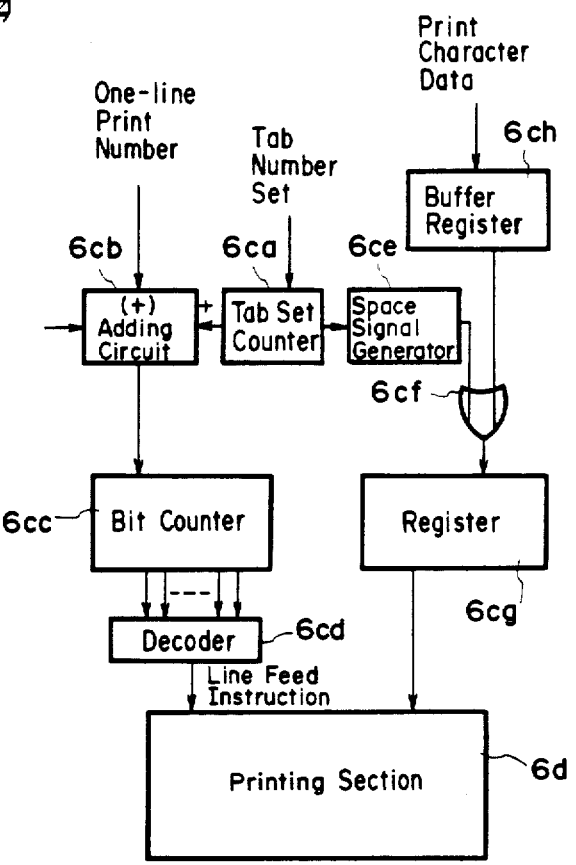
FIG. 3 is a block diagram showing a principal portion of a printer control circuit 6c.

FIG. 2 is a block diagram showing the elements of the printer 6. In the Figure, numeral 6a denotes a data buffer, 6b a decoder for decoding print data transferred from the control device 1, and 6c a printer control circuit. As shown in FIG. 3, the printer control circuit 6c has a tab set counter 6ca, an adding circuit 6cb, a bit counter 6cc, a decoder 6cd for sensing "0", a space signal generator 6ce for generating a space signal, an OR circuit 6cf, and a register 6cg for storing print character data. Numeral 6d denotes a printing section. The tab set counter 6ca, besides being capable of setting a tab number manually, is also capable of setting a tab number in response to a command from the control device 1.

The operation of the printer shown in FIG. 3 will now be described.

First, the tab set counter 6ca is set to a tab number either manually or in response to a command from the control device 1. Then, a "one-line print number" transferred from the control device 1 through the decoder 6b and a tab number from the tab set counter 6ca are added by the adder 6cb, with the resulting sum being loaded into the bit counter 6cc as the print number for one line. The value of the count in the tab set counter 6ca is delivered to the space signal generator 6ce. The latter generates a space signal or space data for a number of spaces equivalent to the value of the count in the tab set counter 6ca, with the space signal being loaded into the print character register 6cg through an OR circuit 6cf. Print character data received from the decoder 6b are temporarily held in the buffer register 6ch. When the space signal generator 6ce finishes generating the space signal, the data are delivered to the buffer register 6ch, whereby the print character data are delivered from the buffer register 6ch to the print character register 6cg through the OR circuit 6cf. The print character data are stored in the print character register 6cg following the already stored space signal or data.

Thereafter, print data are read out of the print character register 6cg and delivered to the printing section one character at a time to perform a printing operation, with the value of the count in the bit counter 6cc being decremented whenever one character is printed. Since a space has been stored at the beginning of the print character register 6cg, at this time a number of spaces equivalent to a predetermined number of characters will appear on the recording paper. Thenceforth, whenever one character is printed by the printing section 6d, the bit counter is decremented. When the status of the counter becomes zero, this is sensed by the decoder 6cd which responds by applying a line feed instruction to the printing section 6d. The data buffer 6a, buffer register 6ch and print character register 6cg are cleared and returned to their original states so that operation shifts to printing of the next line. The bit counter is reset each time one line is printed.

As described in detail above, the present invention is equipped with a processing function which not only enables a data input/output unit to operate in accordance with a command from a host computer in order to create a paper tape, print out transferred data and entered data, but which also enables the unit itself to be programmed independently to create a paper tape and print the data borne by the paper tape. The present invention therefore serves well as a transportable data input/output unit capable of servicing several numerical control devices. Furthermore, in a case where printing is performed on recording paper, a space equivalent to a predetermined number of characters can be provided at the left side of the paper. This not only facilitates binding of the recording paper but also enables printed matter to be brought to the center of printing paper in cases where the paper is large in area. This provides various advantages, such as making it easier to view the printed matter.

According to the present invention, there can be obtained a data input/output unit which is detachable from a host computer and which is adapted so as to maintain a predetermined space at the left side of a paper printed by a printer. The present invention therefore serves well as a transportable data input/output unit capable of servicing several numerical control devices.

We claim:

1. A data input/output unit disconnectable from a host computer, comprising:
   a control device, disconnectable from the host computer, for providing a variable predetermined print number indicative of a number of characters to be printed on each line;
   a read-only memory, operatively connected to said control device, for storing a program necessary for operation of said data input/output unit;
   a random-access memory, operatively connected to said control device, for temporarily storing data;
   a tape reader, operatively connected to the control device, for reading data contained by a tape;
   a tape puncher, operatively connected to said control device, for punching data into a paper tape; and
   a printer operatively connected to said control device and comprising:
      a decoder, operatively connected to said control device, for decoding print data and producing an output signal;
      a printer control circuit, operatively connected to said decoder, for controlling the printer in response to the output signal from said decoder and producing an output signal, said printer control circuit comprising:
         a tab set counter for setting a tab number for a number of spaces; and
         means for adding the predetermined print number to the tab number set by said counter, and for successively placing space print data indicative of the number of spaces at the beginning of data to be printed; and
      a printing section for performing printing in response to the output signal from said printer control circuit.

2. A data input/output unit as recited in claim 1, wherein said printer control circuit further comprises means for counting the spaces and data to be printed and producing a line feed when the count reaches a predetermined number.

3. A data input/output unit, as recited in claim 1, further comprising:
   a common bus connected to said control device, said read-only memory, said random access memory, said tape reader, said tape puncher and said printer;
   a changeover switch connected to said common bus; and
   an interface, connected to said changeover switch, for connection to and disconnection from a host computer.

* * * * *